United States Patent
Markiewicz et al.

(10) Patent No.: US 9,041,660 B2
(45) Date of Patent: May 26, 2015

(54) SOFT KEYBOARD CONTROL

(75) Inventors: Jan-Kristian Markiewicz, Redmond, WA (US); Reed Townsend, Seattle, WA (US); David Matthews, Seattle, WA (US); Vishnu Sivaji, Cubana, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 801 days.

(21) Appl. No.: 12/330,529

(22) Filed: Dec. 9, 2008

(65) Prior Publication Data

US 2010/0141590 A1    Jun. 10, 2010

(51) Int. Cl.
  *G06F 3/041* (2006.01)
  *G06F 3/0488* (2013.01)
  *G06F 3/042* (2006.01)

(52) U.S. Cl.
  CPC ............ *G06F 3/0488* (2013.01); *G06F 3/0426* (2013.01); *G06F 2203/04808* (2013.01); *G06F 2203/04804* (2013.01)

(58) Field of Classification Search
  CPC ..... G06F 3/041; G06F 3/0412; G06F 3/0426; G06F 3/04886
  USPC .................................. 345/173–179
  See application file for complete search history.

(56) References Cited

U.S. PATENT DOCUMENTS

| | | | |
|---|---|---|---|
| 5,252,951 A | 10/1993 | Tannenbaum et al. | |
| 6,121,960 A | 9/2000 | Carroll et al. | |
| 6,501,464 B1 * | 12/2002 | Cobbley et al. | 345/173 |
| 7,768,501 B1 * | 8/2010 | Maddalozzo et al. | 345/173 |
| 8,525,792 B1 * | 9/2013 | Lee et al. | 345/168 |
| 2003/0038821 A1 * | 2/2003 | Kraft | 345/629 |
| 2003/0197687 A1 * | 10/2003 | Shetter | 345/173 |
| 2004/0119750 A1 * | 6/2004 | Harrison | 345/773 |
| 2004/0130575 A1 | 7/2004 | Tai et al. | |
| 2005/0162402 A1 * | 7/2005 | Watanachote | 345/173 |
| 2005/0225538 A1 | 10/2005 | Verhaegh | |
| 2005/0248525 A1 | 11/2005 | Asai | |
| 2005/0275633 A1 * | 12/2005 | Varanda | 345/173 |
| 2006/0097991 A1 | 5/2006 | Hotelling et al. | |
| 2007/0040813 A1 * | 2/2007 | Kushler et al. | 345/173 |
| 2007/0152984 A1 * | 7/2007 | Ording et al. | 345/173 |

(Continued)

FOREIGN PATENT DOCUMENTS

| | | |
|---|---|---|
| CN | 1668994 | 9/2005 |
| JP | 09330175 A | 12/1997 |

(Continued)

OTHER PUBLICATIONS

"International Search Report", Mailed Date: May 28, 2010, Application No. PCT/US2009/063042, Filed Date: Nov. 3, 2009, pp. 12.

(Continued)

*Primary Examiner* — Alexander Eisen
*Assistant Examiner* — Nelson Lam
(74) *Attorney, Agent, or Firm* — Aaron Chatterjee; Kate Drakos; Micky Minhas

(57) ABSTRACT

This document describes tools associated with soft keyboard control functions. In some implementations, the tools recognize a keyboard launch gesture on a touch sensitive screen and present a preview of a keyboard on the touch sensitive screen responsive to the launch gesture. The tools can also display the keyboard on the touch sensitive screen responsive to cessation of the launch gesture.

21 Claims, 9 Drawing Sheets

(56) References Cited

U.S. PATENT DOCUMENTS

| | | | |
|---|---|---|---|
| 2007/0171210 | A1 | 7/2007 | Chaudhri et al. |
| 2007/0216658 | A1* | 9/2007 | Rainisto .................. 345/173 |
| 2007/0247442 | A1 | 10/2007 | Andre et al. |
| 2007/0262964 | A1 | 11/2007 | Zotov et al. |
| 2008/0082934 | A1 | 4/2008 | Kocienda et al. |
| 2008/0165141 | A1* | 7/2008 | Christie .................. 345/173 |
| 2009/0146957 | A1* | 6/2009 | Lee et al. ................ 345/168 |
| 2009/0183098 | A1* | 7/2009 | Casparian et al. ....... 715/765 |
| 2009/0225035 | A1* | 9/2009 | Baik ...................... 345/173 |
| 2010/0020023 | A1* | 1/2010 | Liu ....................... 345/173 |
| 2010/0156793 | A1* | 6/2010 | Ozias et al. ............. 345/168 |
| 2010/0164959 | A1* | 7/2010 | Brown et al. ............ 345/473 |
| 2011/0261058 | A1* | 10/2011 | Luo ....................... 345/441 |

FOREIGN PATENT DOCUMENTS

| | | | |
|---|---|---|---|
| JP | 2004054589 | A | 2/2004 |
| JP | 2007183787 | A | 7/2007 |
| JP | 2007219966 | A | 8/2007 |
| JP | 2007536669 | A | 12/2007 |
| RU | 2127019 | C1 | 2/1999 |
| WO | 2005106637 | A2 | 11/2005 |
| WO | WO 2007045938 | A1 | 4/2007 |

OTHER PUBLICATIONS

Adcock Nate, "New InterVVrite Soft Keyboard 9.5 Review", Retrieved at<<http://www.pocketpcmag.com/cms/blogs/30/new_interwrite_soft_keyboard_9_5_review>>, Mar. 3, 2007, pp. 1-4.
Spencer Bob, "Mobile Internet Device Application User Interface Design Guide", Retrieved at<<http://www.moblin.org/pdfs/MID_app_design_guide.pdf>>, Jun. 4, 2007, pp. 17.
"New Palm Treo Pro", Retrieved at<<http://blogs.pocketwiz.com.au/wordpress/>>, Aug. 21, 2008, pp. 1-6.
CN Notice on the Second Office Action for Application No. 200980150118.X, Jun. 27, 2013.
Chinese Patent Appln. 200980150118.X; First Office Action dated Jan. 31, 2013; 10 pages.
Russian Patent Office, RU 2011123404, Office Action Dated Dec. 27, 2013.
People's Republic of China Patent Office, CN 200980150118.X, $3^{rd}$ Office Action Dated Dec. 16, 2013.
People's Republic of China Patent Office, CN 200980150118.X, Response Filed Feb. 28, 2014 to the $3^{rd}$ Office Action Dated Dec. 16, 2013.
European Patent Office, EP 09836579.4 Extended European Search Report and European Search Opinion, Dated May 8, 2013, 8 pages.
"Notice of Allowance," Dec. 3, 2014, From Chinese Patent Application No. 200980150118.X, Filed Date: Dec. 3, 2014, 9 pages.
"Office Action," From Japanese Patent Application No. 2011-540741, Mailed Date: Sep. 30, 2014, 4 Pages.
"Response to Office Action," From Japanese Patent Application No. 2011-540741, Mailed Date: Dec. 15, 2014, 5 Pages.
"Response to Office Action," From Chinese Patent Application No. 200980150118.X, Filed Date: Aug. 30, 2013, 7 pages.
"Fourth Office Action Issued in China Patent Application No. 200980150118.X", Mailed Date: Jun. 25, 2014, 12 Pages.
"Notice of Allowance Issued in Russian Federation Patent Application No. 2011123404", Mailed Date: Jul. 30, 2014, 9 Pages.
"Office Action Issued in European Patent Application No. 09836579.4", Mailed Date: May 14, 2014, 7 Pages.
"Office Action Issued in Japan Patent Application No. 2011-540741", Mailed Date: Nov. 18, 2013, 2 Pages.
"Response to Office Action Issued in Japan Patent Application No. 2011-540741", Filed Date: Apr. 17, 2014.
"Office Action Issued in Russian Patent Application No. 2011123404", Mailed Date: Dec. 27, 2013.
"Response to Office Action Issued in Russian Patent Application No. 2011123404", Mailed Date: Dec. 27, 2013.
"Response to the First Office Action Issued in China Patent Application No. 200980150118.X", Mailed Date: Feb. 26, 2013.
"Response to the Second Office Action Issued in China Patent Application No. 200980150118.X", Mailed Date: Feb. 26, 2013.
European Patent Office, EP Response Filed Nov. 28, 2013 to the First Office Action for Application No. 09836579.4, 14 pages.
European Patent Office, EP Second Office Action Dated May 14, 2014 for Application No. 09836579.4, 7 pages.
Response to the Fourth Office Action Issued in China Patent Application No. 200980150118.X, Filed Date: Sep. 9, 2014, 15 Pages.

* cited by examiner

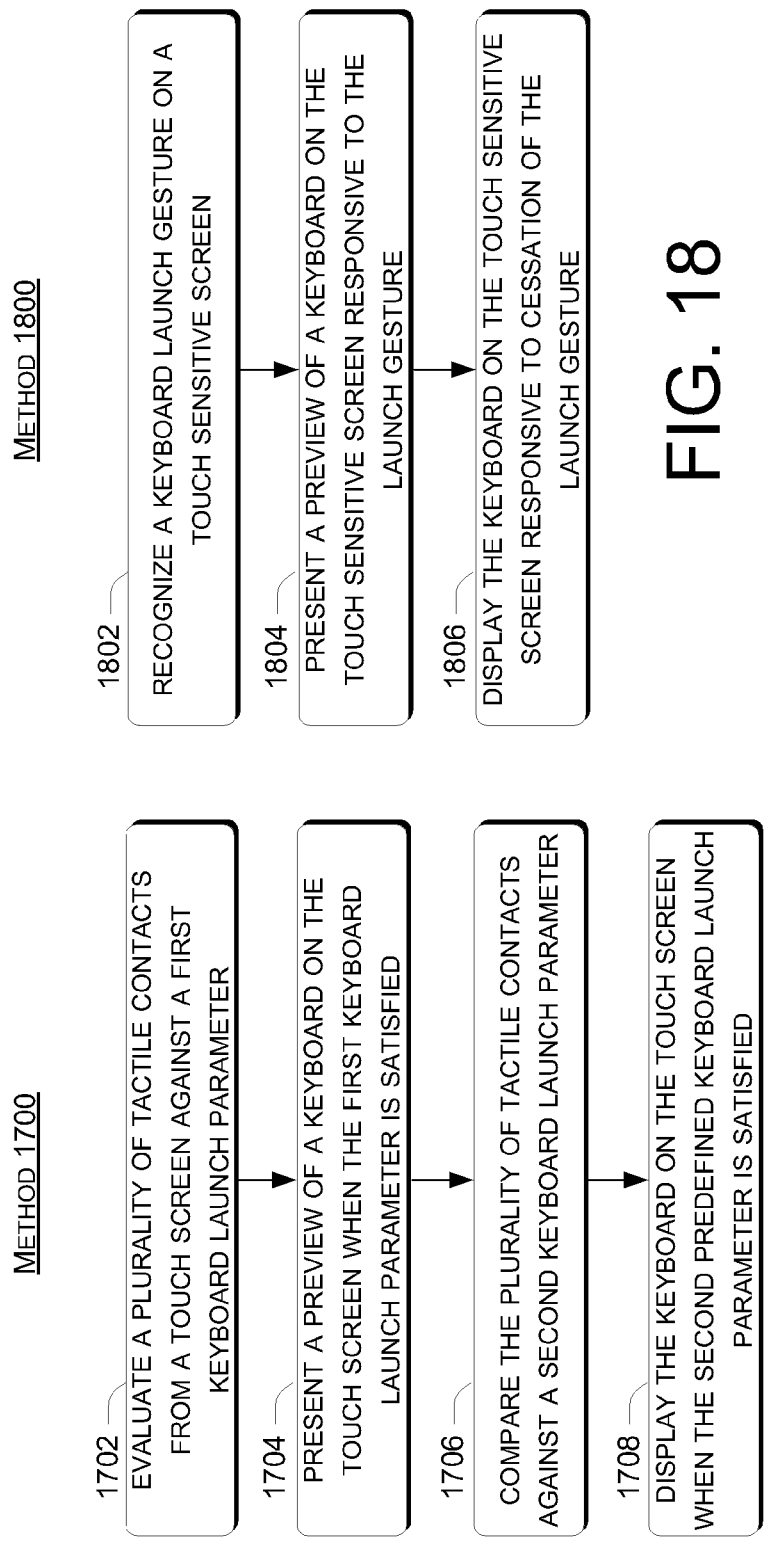

SOFT KEYBOARD CONTROL

BACKGROUND

Computing devices continue to evolve into different configurations, such as notebook computers, personal digital assistants (PDAs) cellphones/smart phones etc. Many of these devices are under market pressures to be as small as possible. Despite the sizing pressures, the devices' graphical user interface (GUI) remains a central focus of the devices and users tend to want the GUI to be as large as possible. Toward this goal many devices have adopted touch sensitive screens that can perform both input and output functions. These configurations can utilize a soft keyboard (i.e., a visual keyboard presented on the touch sensitive screen to replace or augment traditional keyboards). Accordingly, traditional input devices, such as keyboards have been reduced in size or eliminated to make space available for the touch sensitive screen. While soft keyboards offer several advantages, the ability of the user to launch the soft keyboard and/or to control the soft keyboard remains rudimentary. The present concepts offer enhanced soft keyboard usability and controllability to the user.

SUMMARY

This document describes tools associated with soft keyboard control functions. In some implementations, the tools recognize a keyboard launch gesture on a touch sensitive screen and present a preview of a keyboard on the touch sensitive screen responsive to the launch gesture. The tools can also display the keyboard on the touch sensitive screen responsive to cessation of the launch gesture.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions (e.g., one or more computer-readable media having executable instructions), components, and/or technique(s) as permitted by the context above and throughout this document.

BRIEF DESCRIPTION OF THE DRAWINGS

The detailed description is described with reference to the accompanying figures. In the figures, the left-most digit(s) of a reference number identifies the figure in which the reference number first appears. The use of similar reference numbers in different instances in the description and the figures may indicate similar or identical items.

FIGS. 17-19 are flow diagrams of soft keyboard control methods in accordance with some implementations.

DETAILED DESCRIPTION

Overview

More and more, computing systems are sold with touch screens. Touch screens accept user input based on physical contact, such as tactile contact from one or more stylus or finger contacts, with one or more contact detectors included in the touch screen. Current touch screens, however, do not readily allow a user to launch a soft keyboard on the touch screen. For instance, some existing technologies make the user go through multiple cumbersome steps to launch a soft keyboard. Other existing technologies do not allow the user to readily control the size and/or location of the soft keyboard on the touch screen.

This document describes tools for launching a soft keyboard in an intuitive way and allowing the user to readily control many facets of the soft keyboard, such as its size and/or relative location on the touch screen. For instance, in one implementation, the user simply contacts the touch screen with a typing gesture and the soft keyboard is launched directly underneath and lined-up with the user's fingers. Such a configuration can allow the user to begin typing without even looking at the soft keyboard.

Example Screenshots

FIGS. 1-14 illustrate exemplary manifestations of the soft keyboard control concepts described in this document.

Figure 1:
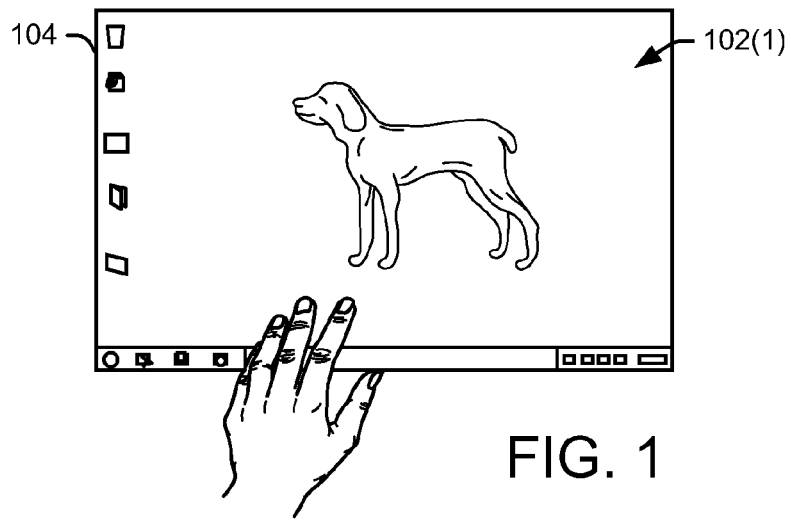
FIGS. 1-14 are exemplary screenshots depicting soft keyboard control concepts in accordance with some implementations.
Figure 2:
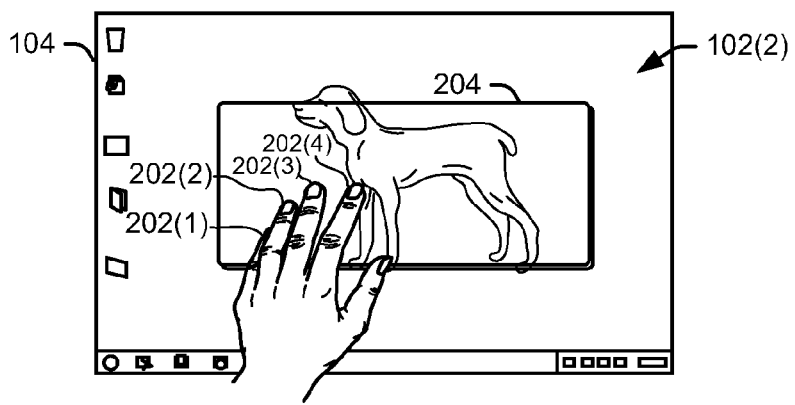
Figure 3:
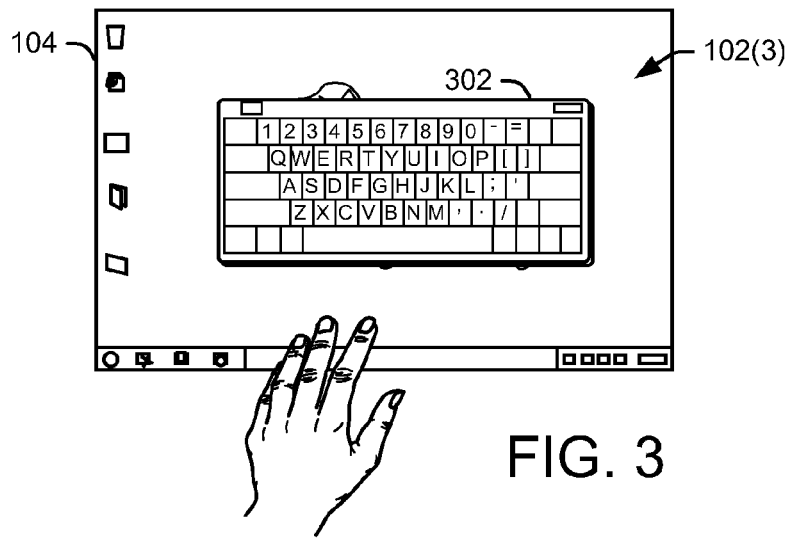

FIGS. 1-3 collectively illustrate a first soft keyboard control implementation via three successive screenshots 102(1), 102(2), and 102(3) of a touch screen 104. In FIG. 1 a user's hand 106 is proximate but not contacting touch screen 104. In FIG. 2, four of the user's digits 202(1), 202(2), 202(3), 202(4) are contacting the touch screen in a manner that causes a keyboard preview 204 to be displayed proximate to the digits 202(1)-202(4). In this case, the keyboard preview 204 is in an outline form. Another configuration is introduced below in relation to FIGS. 4-6. In this implementation, the keyboard preview is maintained as long as the user maintains the described contact.

FIG. 3 shows an instance where the user has ceased the contact of FIG. 2 and removed his/her hand and a soft keyboard 302 replaces the keyboard preview 204 of FIG. 2. At this point the user can engage the soft keyboard 302 to type on touch screen 104 in a traditional manner.

Figure 4:
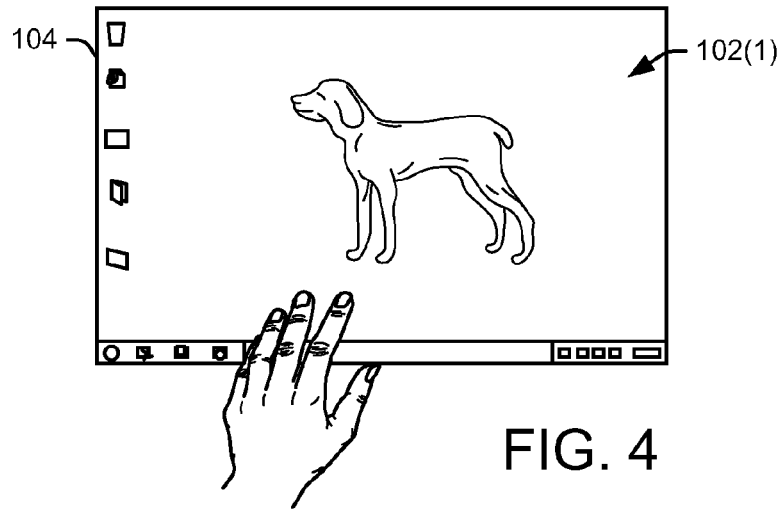
Figure 5:
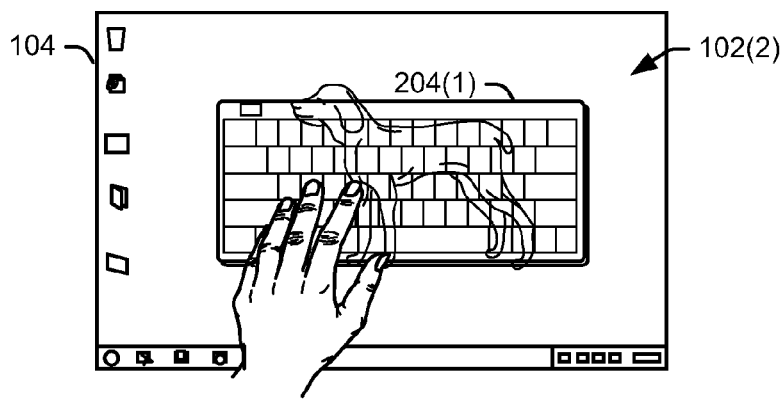
Figure 6:
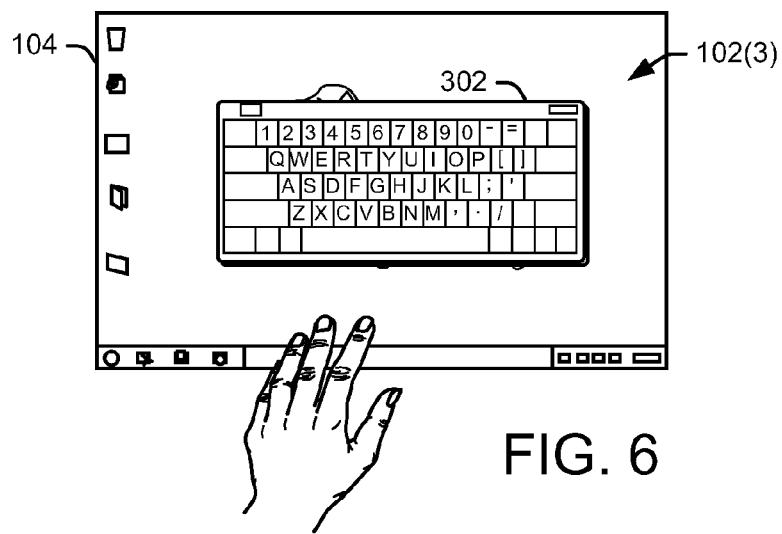

FIGS. 4-6 are similar to FIGS. 1-3 and include a majority of like components which will not be reintroduced here for sake of brevity. In this implementation a keyboard preview 204(1) is a semi-transparent representation of keyboard 302. The semi-transparent keyboard preview (i.e., having a relatively high degree of transparency) can allow the user to see both keys as well as objects, such as icons positioned behind the keyboard preview. This configuration can allow the user to determine if he/she is going to be satisfied with the keyboard location and/or size. If the user is not satisfied with the keyboard location and/or size, such as if the keyboard is going to be positioned over an icon that the user wants to access, then the user can move the keyboard preview 204(1). Examples of how the user can move/resize the soft keyboard and/or keyboard preview are described below in relation to FIGS. 7-12.

Figure 7:
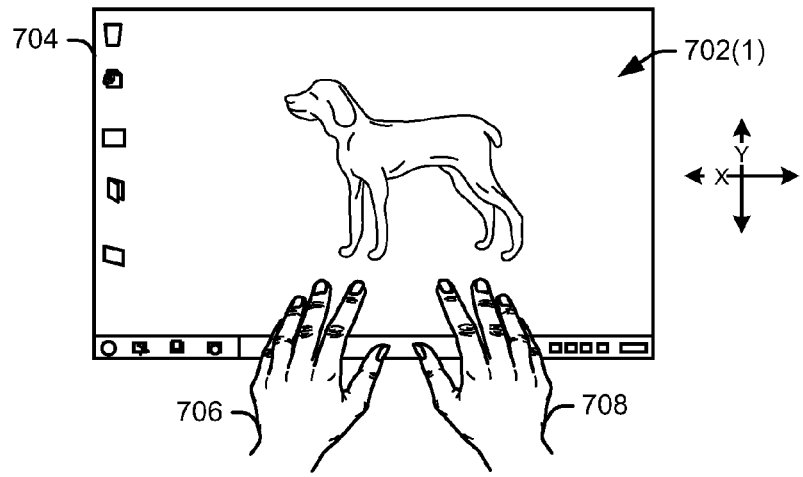
Figure 8:
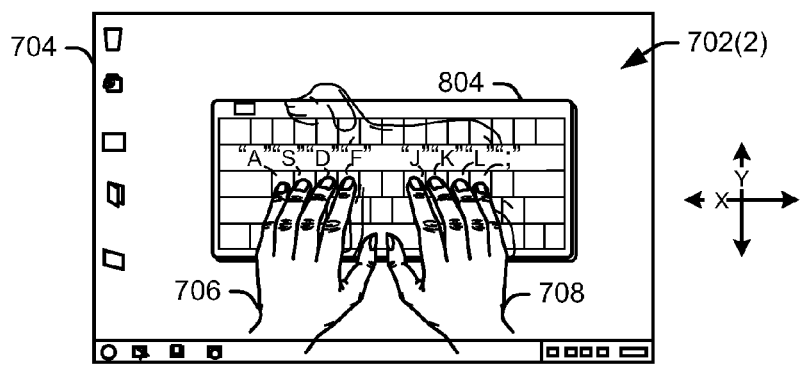
Figure 9:
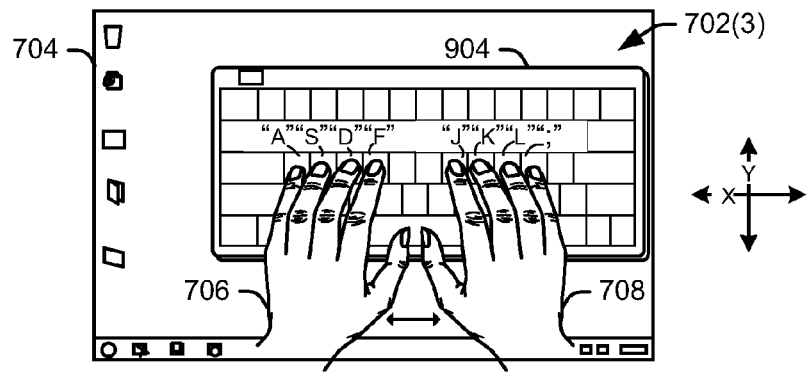
Figure 10:
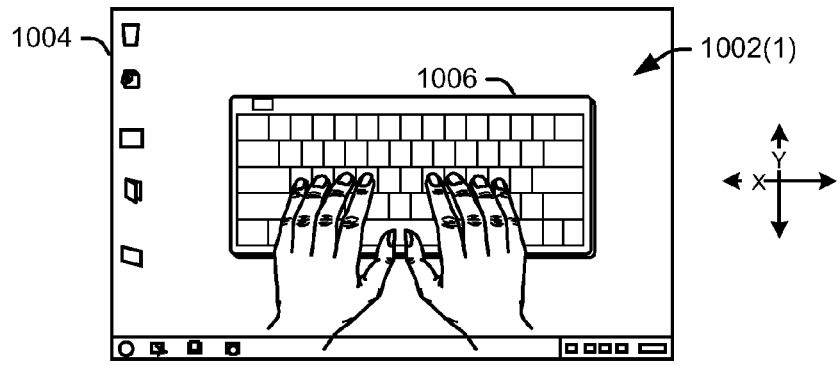

FIGS. 7-9 collectively illustrate another soft keyboard control implementation via three successive screenshots 702(1), 702(2), and 702(3) of a touch screen 704. In FIG. 7, the user's left and right hands 706, 708 are proximate but not contacting touch screen 704.

In FIG. 8, the user contacts touch screen 704 with both hands in a typing gesture. In this case, the user contacts the touch screen with all ten digits in the typing gesture. Responsively, a keyboard preview 804 is generated underneath the user's hands. Further, in this case, the preview is sized and positioned so that the keys of the keyboard preview are appropriately positioned beneath the user's fingers in the typing gesture. For instance, "a", "s", "d" and "f" keys are positioned under the fingers of the user's left hand and "j", "k", "l" and ";" keys are positioned under the fingers of the user's right hand. Thus, the "f" key is positioned under the rightmost finger or member of the left hand (i.e., the left index finger). The "j" key is positioned under the leftmost finger of the right hand (i.e., the right index finger). This configuration can make it easier for the user to begin typing than other configurations where the user has to align his/her fingers with the proper keys. (Note that a portion of the background of the touch screen is blocked out in FIG. 8 to allow the users to more readily view the designators).

As evidenced by comparing FIGS. 8 and 9, the present implementation can allow the user to resize the keyboard preview simply by sliding his/her hands apart. In this case, the user slid the right hand away from the left hand along the x-axis and the keyboard preview 904 is resized accordingly. Further, this configuration resizes (in this case enlarges) the keyboard preview to maintain generally the same finger-to-key relationships as FIG. 8. Stated another way, the finger-to-key relationship is maintained during the resize operation so that the user can begin typing once they are satisfied with the keyboard.

FIGS. 10-13 illustrate an example of how a user can move a soft keyboard. This series begins at screenshot 1002(1) where the user's hands are contacting the touch screen 1004. Responsively, a keyboard preview 1006 is presented under the user's hands.

Figure 11:
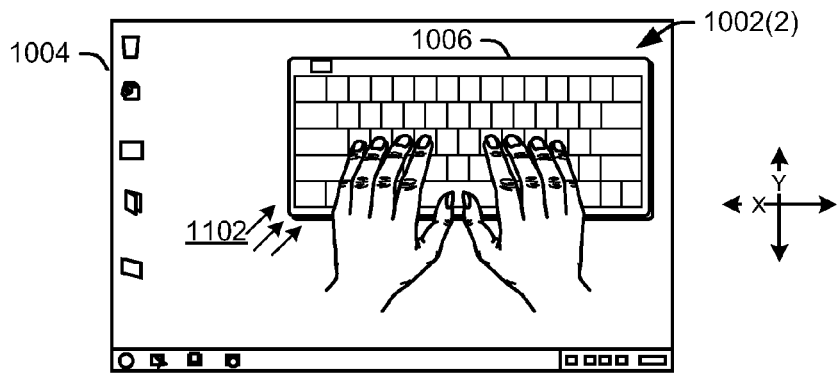
Figure 12:
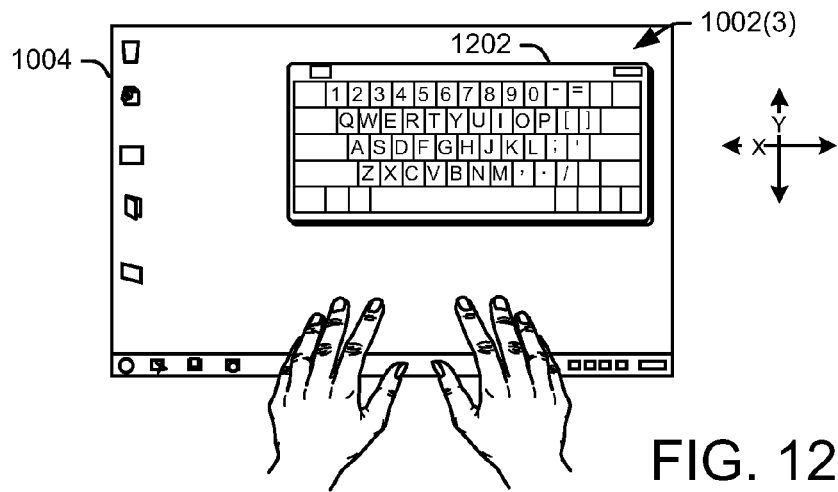

FIG. 11 shows the user sliding his/her hands up and to the right as indicated by arrows 1102 on screenshot 1002(2). The keyboard preview 1006 responsively slides under the user's hands (or at least can appear to slide under the user's hands to the user). Once the user is satisfied with the position of the keyboard the user can remove his/her hands and the keyboard preview is replaced with a keyboard 1202 as indicated in FIG. 12 by screenshot 1002(3).

Figure 13:
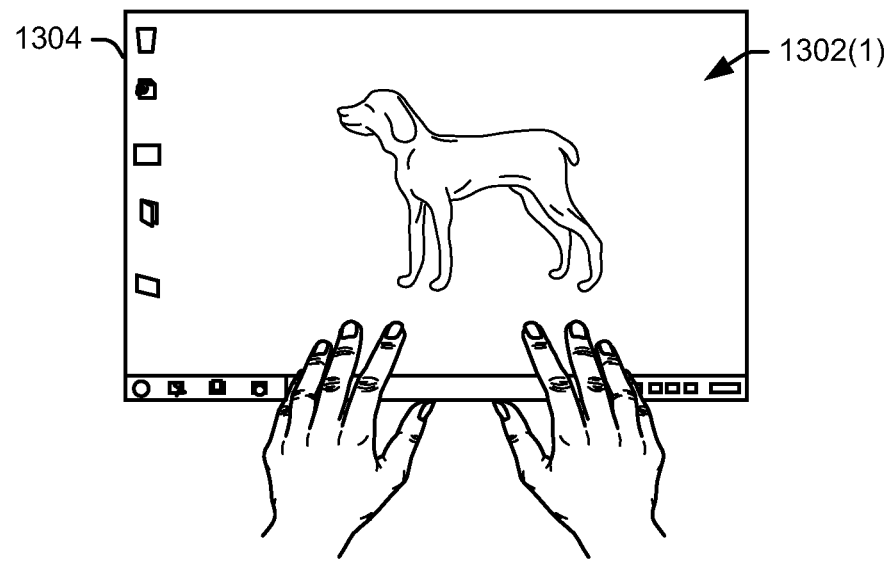
Figure 14:
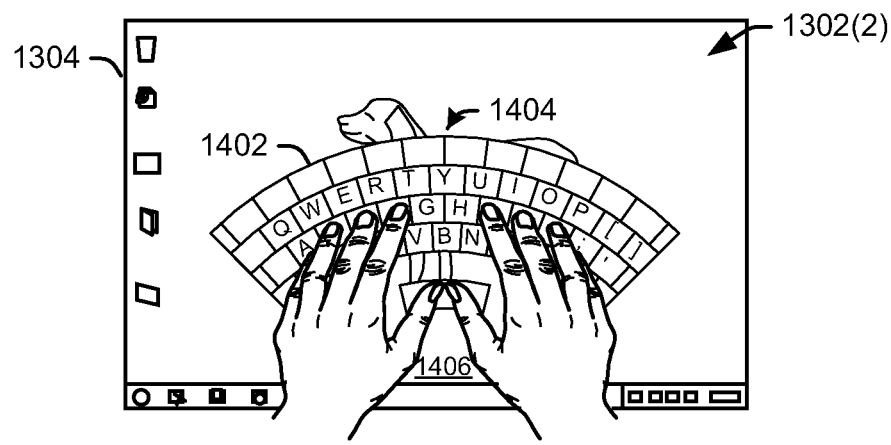

FIGS. 13-14 show another keyboard control implementation. The FIGS. show consecutive screenshots 1302(1) and 1302(2) of a touch screen 1304. In FIG. 13 a user's hands are proximate to but not contacting touch screen 1304. In FIG. 14, the user has placed all ten digits of his/her hands on the touch screen in a manner that has caused a keyboard preview 1402 to be generated under the user's hands. In this case, the keyboard preview has an ergonomic configuration. Further, the ergonomic configuration is established with the relative position of the keys determined by the position of the user's digits.

In this instance, based upon the position of the user's digits the keyboard preview 1402 has keys relatively widely spaced toward the top 1404 and relatively closely spaced toward the bottom 1406. Depending on the position of the user's digits, other configurations can have relatively wide spacing and/or a gap between keys at the bottom 1406 of the keyboard preview 1402 and relatively close spacing toward the top 1404 of the keyboard preview. Some implementations can allow the user to adjust his/her digit positions and update the keyboard preview 1402 accordingly. Once the user is satisfied with the ergonomic configuration of the keyboard preview the user can remove his/her digits and a corresponding soft keyboard can be displayed in place of the keyboard preview.

Example Operating Environment

Figure 15:
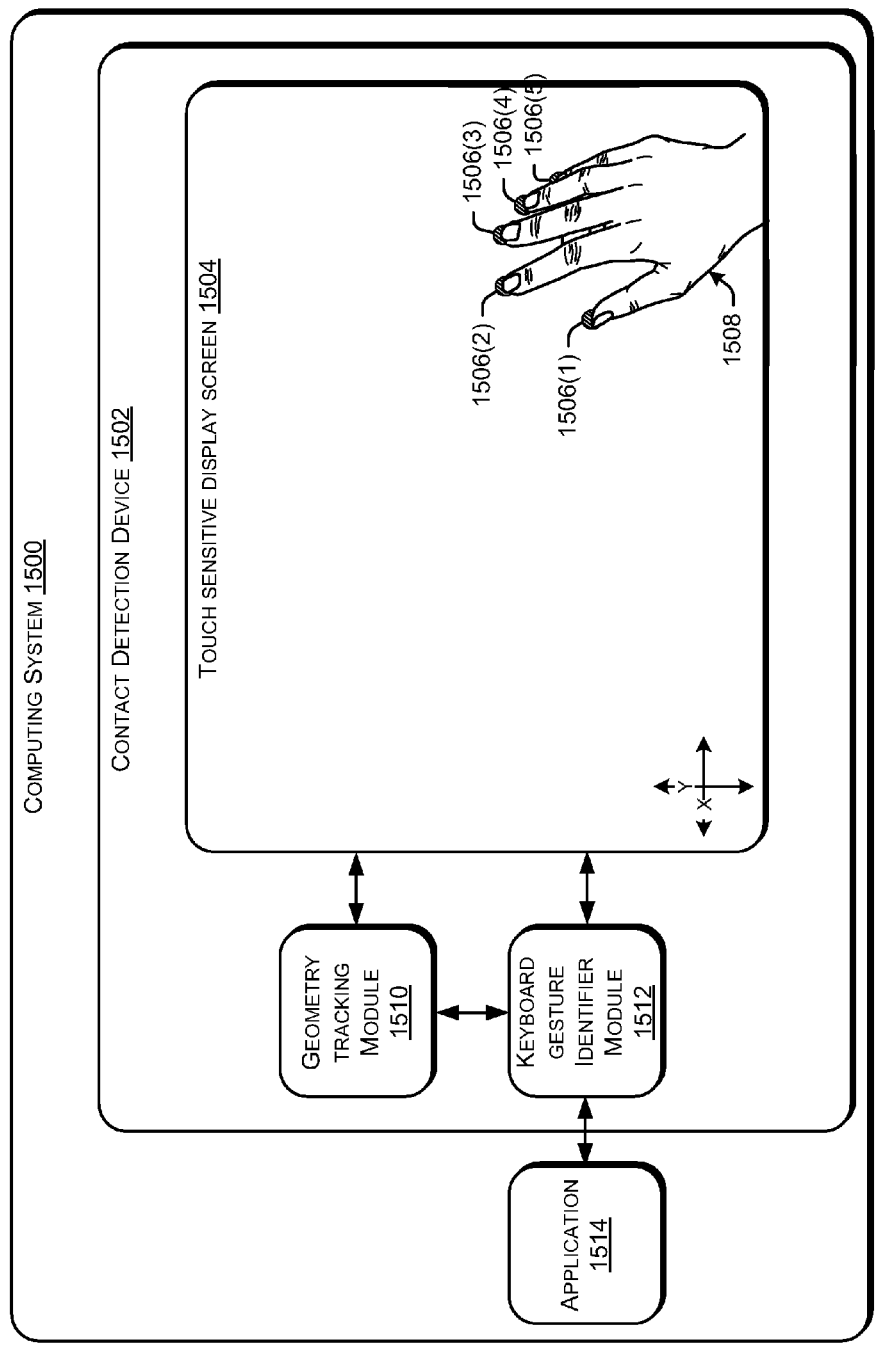
FIGS. 15-16 are illustrations of an example environment employing soft keyboard control.
Figure 16:
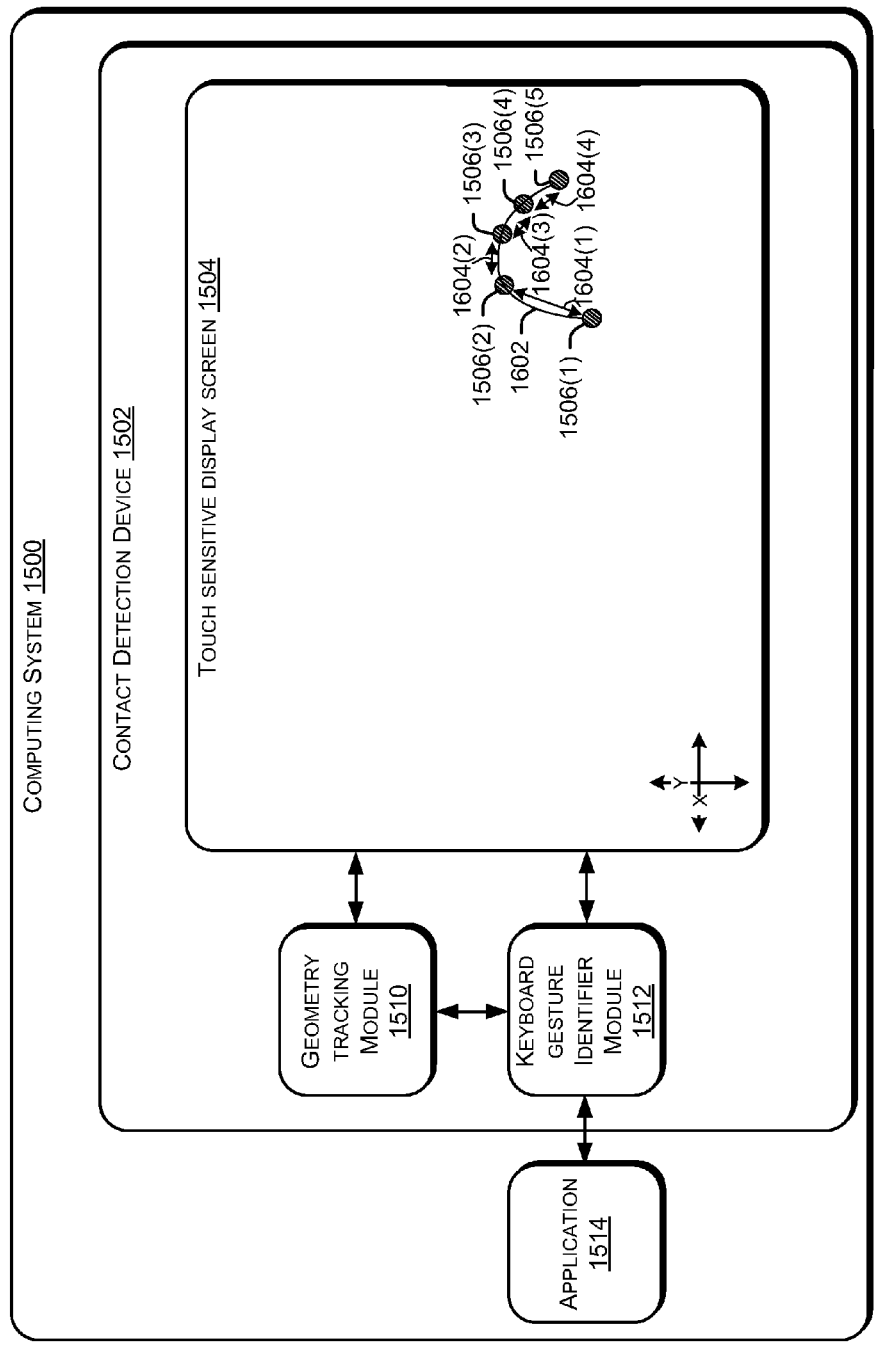

FIGS. 15-16 reference a computing system 1500 that includes a contact detection device 1502. The contact detection device can include a touch sensitive display screen (e.g. touch screen) 1504. The touch screen 1504 can include some type of contact detectors 1506 interspersed thereon. For sake of brevity only five representative contact detectors 1506(1), 1506(2), 1506(3), 1506(4), and 1506(5) are illustrated. In this case, the contact detectors 1506(1)-1506(5) have been activated by the digits of a user's hand 1508 (not shown in FIG. 16).

A geometry tracking module 1510 can track the contact detectors 1506 and their relative states (i.e. activated or inactivated) on touch screen 1504. Geometry tracking module 1510 can alternatively, or additionally, track various content displayed on the touch screen such as graphical windows, icons, etc. For instance, the geometry tracking module may track the contact detectors and or content via a plane defined by the illustrated x and y axes.

User input detected by activated contact detectors 1506(1)-1506(5) can be sent to a keyboard gesture identifier module 1512 either directly or via geometry tracking module 1510. The keyboard gesture identifier module 1512 can analyze the user input utilizing various parameters to identify whether the input is a keyboard launch gesture. The keyboard gesture identifier module 1512 can communicate with an application 1514 based upon the analyzed contact gestures as described below.

Examples of parameters that can be utilized by the keyboard gesture identifier module 1512 can include relative distance between the activated contact detectors 1506(1)-1506(5), a shape of a line connecting activated contact detectors 1506(1)-1506(5), a number of activated contact detectors 1506(1)-1506(5), and a duration of the activation, among others. Two of these parameter examples are illustrated in FIG. 16 where a line 1602 is drawn between the activated contact detectors 1506(1)-1506(5). In this case, the line shape parameter may be utilized to determine whether the user contacts constitute a keyboard launch gesture. For instance, if a line drawn between the contact points 1506(1)-1506(5) is generally arcuate then the parameter can indicate a typing gesture. In contrast, a wavy line or a straight line may not indicate a typing gesture. In this example, line 1602 provides an example of an arcuate line.

This implementation uses all five activated contact detectors (i.e., from all five digits) of a single hand. Other implementations may use parameter algorithms that can emphasize the contacts from the fingers (i.e., activated contact detectors 1506(2)-1506(5)) and exclude the contact from the thumb (i.e., 1506(1) activated contact detector) when drawing line 1602. In one case, the contact from the fingers of one hand can be distinguished in that they tend to be clustered together. In contrast, contact from the thumb tends to be relatively more distal from the cluster. Other implementations can detect contact from both hands. The contact from the user's pair of hands can be analyzed together or divided into a set for the left hand and a set for the right hand.

Relative distance between contact points is the second illustrated parameter that can be analyzed by the keyboard gesture identifier module 1512 to detect keyboard launch gestures. Relative distance is illustrated in FIG. 16 at 1604(1), 1604(2), 1604(3), and 1604(4). In one example, this parameter can be associated with a range, such as from ¼" to 1". In such a case, if three of more individual adjacent contacts of the five contacts are separated by at least ¼" but no more than 1" then the parameter indicates that the received contacts relate to a keyboard launch gesture. Still other implementations can analyze the contact points against multiple parameters to identify a typing gesture. For instance, in the illustrated configuration, some implementations can require that the contact points satisfy both the line parameter and the relative distance parameter to be recognized as a typing gesture. The skilled artisan should recognize other distances besides the examples provided here that can be utilized with some implementations.

Some implementations can analyze only simultaneous user contacts (i.e., all fingers down at once). Other implementations can analyze a rolling action where the user rolls the digits in order from thumb to pinky or pinky to thumb. The latter implementations can utilize a time parameter to distinguish a rolling motion keyboard launch gesture from other user contact. For instance, these implementations may analyze whether the consecutive contacts occurred within a predefined time, such as one second and/or whether the consecutive contacts were entered sequentially in a left to right or right to left manner along the x-axis. Still other implementations can accept both simultaneous and rolling keyboard launch gestures. While keyboard launch gestures relating to 4 or 5 contacts from the user's hand are described in detail above, other implementations can identify fewer contacts as a keyboard launch gesture. Some implementations can further allow the user to predefine what contact pattern should be recognized as a keyboard launch gesture.

Upon identifying keyboard launch gestures, the keyboard gesture identifier module 1512 can initiate an application 1514 to provide an associated function (e.g., generating a keyboard, repositioning/moving the keyboard, and resizing the keyboard) that is mapped to the gesture.

Various systems and devices may benefit from the contact detection device 1502, such as media players, remote controls, smart phones, personal digital assistants, personal audio devices, global positioning systems, Internet appliances, wireless connectivity devices, vehicle control systems, vehicle entertainment systems, tablet computers, laptop computers, stand-alone input and/or output devices, and the like. Note that the contact detection device 1502 can comprise, or have access to computer-readable media on which various applications, software, or other executable instructions may be stored.

In some embodiments, the contact detection device 1502 is operating system (OS) specific. When the multi-input system is OS specific, contact detection device 1502 provides functions that are specific to the OS and various applications (e.g., the application 1514) configured for use with the OS. In other embodiments, the contact detection device 1502 is configured for a specific application. The OS or a module within the OS may act as an intermediary between the contact detection device 1502 and the application 1514.

Generally, any of the functions described herein can be implemented using software, firmware, hardware (e.g., fixed-logic circuitry), manual processing, or a combination of these implementations. The terms "tool" or "tools" and "module" or "modules" as used herein generally represent software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the tools and modules are platform-independent, meaning that they may be implemented on a variety of commercial computing platforms having a variety of processors.

Example Techniques

The following discussion describes various soft keyboard launch techniques, methods, and procedures, which may be implemented in hardware, firmware, software, or a combination thereof. The methods are shown as a set of blocks that specify operations performed by one or more entities, devices, modules, and/or the tools, such as keyboard gesture identifier module 1512 of FIGS. 15-16, and are not necessarily limited to the orders shown for performing the operations by the respective blocks. Further, the methods can be completed by other entities than those in the described devices/systems. A variety of other examples and sub-techniques are also contemplated.

FIG. 17 depicts a first soft keyboard launch method 1700.

Block 1702 evaluates a plurality of tactile contacts from a touch screen against a first keyboard launch parameter. Examples of first keyboard launch parameters can include spatial relationships of the plurality of tactile contacts on the touch screen and a shape of a line drawn through the contacts among others.

Block 1704 presents a preview of a keyboard on the touch screen when the first keyboard launch parameter is satisfied. In one case, the preview can be presented in outline form. In another instance, the preview can be presented with a high degree of transparency.

Block 1706 compares the plurality of tactile contacts against a second keyboard launch parameter. In one case, the second keyboard launch parameter relates to a duration of time. For instance, if the user holds down his/her fingers (i.e., maintains the contacts) for at least a predefined period of time, such as one second then the parameter is satisfied.

Block 1708 displays the keyboard on the touch screen when the second predefined keyboard launch parameter is satisfied. In some cases, the keyboard can be displayed at a predefined location on the touch screen. Other implementations can display the keyboard under the plurality of tactile contacts. In some of these cases, the size of the keyboard can be defined by the spacing of the contacts so that the keyboard is properly positioned under the user's hand(s).

FIG. 18 depicts a second soft keyboard launch method 1800.

Block 1802 recognizes a keyboard launch gesture on a touch sensitive screen. Various techniques for recognizing keyboard launch gestures are described above and below.

Block 1804 presents a preview of a keyboard on the touch sensitive screen responsive to the launch gesture. Non-limiting examples of keyboard previews are illustrated in FIGS. 1-14 above. In one implementation, upon recognition of a keyboard launch gesture, the preview is presented on the touch screen positioned under the user's hand(s). The preview is presented as long as the user maintains the contact. This can allow the user an opportunity to reposition and/or resize the keyboard as desired.

Block 1806 displays the keyboard on the touch sensitive screen responsive to cessation of the launch gesture. Continuing with the above example, a preview is presented to the user so that the user can reposition and/or resize the preview to his/her satisfaction. Once the user is satisfied with the size and/or position of the keyboard, the user can remove his/her hands and the keyboard is displayed for them.

Figure 19:
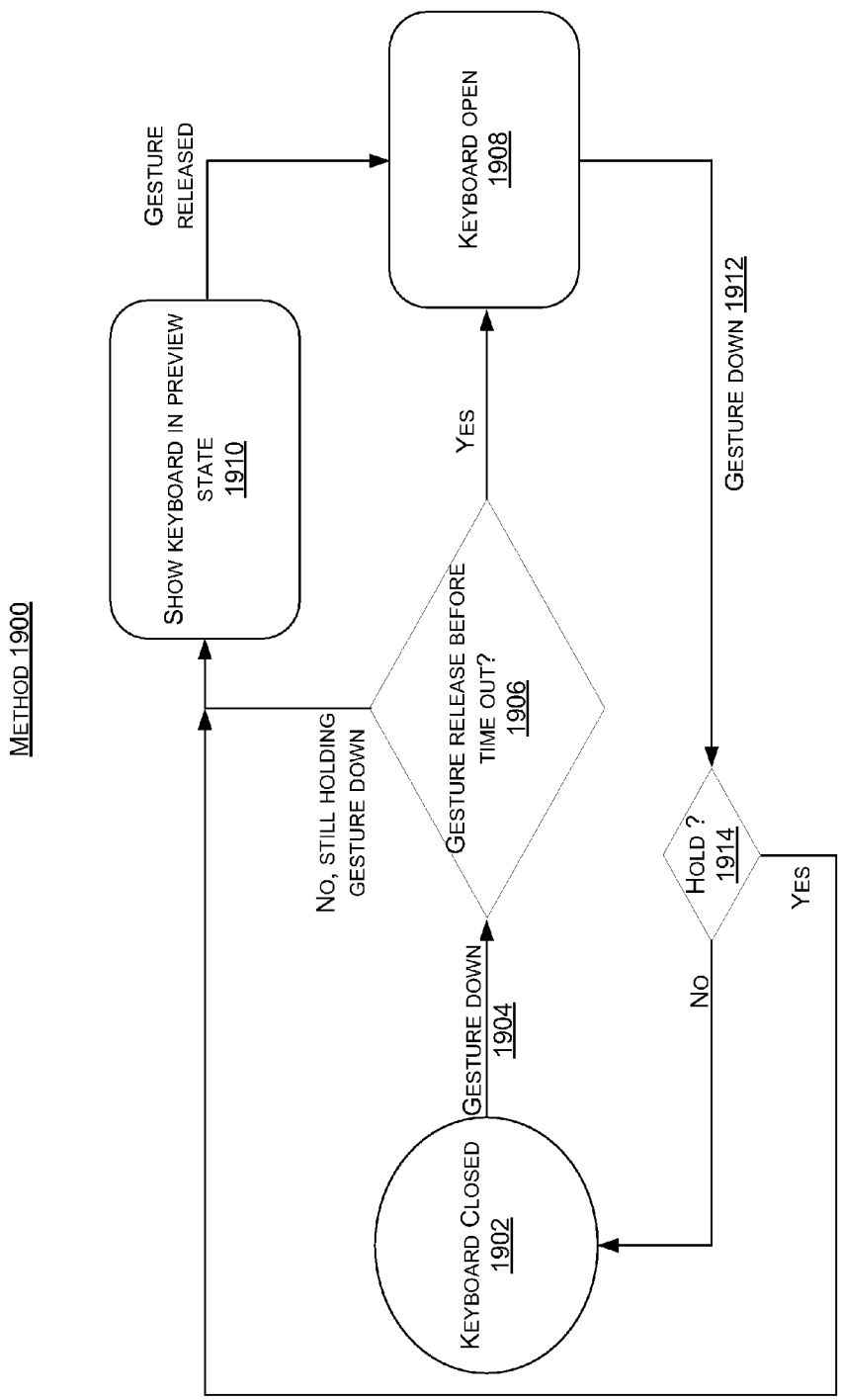

FIG. 19 depicts a third soft keyboard launch method 1900. The method begins at 1902 with the keyboard closed (i.e., not displayed on the touch screen).

The method detects a keyboard launch gesture down at 1904 (i.e., the user contacts the touch screen in a manner that is recognized as a keyboard launch gesture).

The method determines whether the gesture is released before a time-out (i.e., predefined time) at 1906. In an instance where the user releases the gesture (i.e., yes at 1906) then the method proceeds to block and opens (i.e., launches) the keyboard. Otherwise, (i.e., no at 1906) the method proceeds to block 1910.

Block 1910 shows the keyboard in preview state, such as an outline or transparent. If the gesture is released then the process proceeds to block 1908. So, for instance, the sequence 1904, 1906, and 1908 can occur when the user quickly taps the screen with a keyboard launch gesture. The keyboard is displayed and the user can begin typing. Sequence 1904, 1906, 1910, and 1908 can be encountered when the user contacts and maintains contact in a launch gesture. In that case, once the user maintains the contact for the predefined time such as 0.5 seconds, a preview of the keyboard can be generated for the user. The user can then move and/or resize the preview. Once the user is satisfied and releases the contact a corresponding keyboard can be opened or launched at 1908.

Subsequently, the user can again contact the touch screen in the gesture down manner at 1912. The method can query whether the user holds the gesture at 1914, such as for a predefined period of time. If the user does not hold the gesture (i.e., no at 1914), such as if the user taps the gesture then the method can proceed to block 1902 and close the keyboard. If the user holds the gesture (i.e., yes at 1914), then the method can proceed to 1910 and convert the keyboard to a keyboard preview. For instance, if the user wants to move and/or resize an open keyboard then he/she can once again make and hold the keyboard launch gesture to proceed to block 1910. Block 1910 generates the keyboard preview. In this case, the keyboard would revert from an open keyboard to a keyboard preview. The user can then move/resize the keyboard preview and then release when ready to once again open the keyboard at 1908.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   recognizing a keyboard launch gesture of a user on a touch sensitive screen;
   presenting a semi-transparent keyboard preview of a keyboard on the touch sensitive screen responsive to the keyboard launch gesture, wherein the semi-transparent keyboard preview has relatively more transparency than the keyboard;
   while the user maintains contact with one or more digits on the touch sensitive screen and slides the one or more digits on the touch sensitive screen, repositioning the semi-transparent keyboard preview on the touch sensitive screen according to the sliding of the one or more digits on the touch sensitive screen, wherein the semi-transparent keyboard preview remains semi-transparent during the repositioning;
   determining that the one or more digits have ceased making contact with the touch sensitive screen; and
   when the one or more digits have ceased making contact with the touch sensitive screen, replacing the semi-transparent keyboard preview on the touch sensitive screen with the keyboard.

2. The method of claim 1, wherein the recognizing the keyboard launch gesture comprises recognizing one of: three fingers of one hand in a typing position, four fingers of one hand in a typing position, four fingers and a thumb of one hand in a typing position, four fingers from each hand of a pair of hands in a typing position or four fingers and a thumb from each hand of a pair of hands in a typing position.

3. The method of claim 1, wherein the keyboard shows symbols on individual keys of the keyboard that are not shown on the semi-transparent keyboard preview.

4. The method of claim 1, wherein the presenting comprises initially presenting the semi-transparent keyboard preview at a location on the touch sensitive screen where the keyboard launch gesture is received.

5. The method of claim 1, further comprising removing the keyboard when the keyboard launch gesture is repeated.

6. The method of claim 1, wherein:
   the semi-transparent keyboard preview allows the user to see both keys on the semi-transparent keyboard preview and objects positioned behind the semi-transparent keyboard preview, and
   the replacing the semi-transparent keyboard preview with the keyboard causes the objects positioned behind the semi-transparent keyboard preview to be obscured by the keyboard.

7. The method according to claim 6, wherein the objects comprise icons positioned behind the semi-transparent keyboard preview.

8. The method according to claim 1, further comprising presenting the semi-transparent keyboard preview in an ergonomic configuration established by relative position of keys of the semi-transparent keyboard preview, the relative position of the keys of the semi-transparent keyboard preview being established by positions of the one or more digits of the user.

9. One or more computer-readable memory devices or storage devices comprising instructions which, when executed by a computing device, cause the computing device to perform acts comprising:
   recognizing a keyboard launch gesture by a hand of a user on a touch sensitive screen;
   presenting a semi-transparent keyboard preview on the touch sensitive screen responsive to the keyboard launch gesture, wherein the semi-transparent keyboard preview is a semi-transparent representation of a keyboard;
   while the hand of the user moves along the touch sensitive screen while maintaining contact with the touch sensitive screen, repositioning the semi-transparent keyboard preview on the touch sensitive screen according to the movement of the hand of the user along the touch sensitive screen, wherein the semi-transparent keyboard preview remains semi-transparent during the repositioning;
   detecting that the hand of the user has ceased making contact with the touch sensitive screen; and
   responsive to detecting that the hand of the user has ceased making contact with the touch sensitive screen, replacing the semi-transparent keyboard preview on the touch sensitive screen with the keyboard, wherein the keyboard has relatively less transparency than the semi-transparent keyboard preview.

10. The one or more computer-readable memory devices or storage devices of claim 9, the acts further comprising:
    spacing certain keys relatively widely toward the top of the semi-transparent keyboard preview of the keyboard and spacing other keys relatively closely toward the bottom of the semi-transparent keyboard preview, the spacing being based upon positions of digits of the hand of the user on the touch sensitive screen.

11. The one or more computer-readable memory devices or storage devices of claim 9, the acts further comprising:
    updating the semi-transparent keyboard preview according to the user adjusting positions of digits of the hand of the user.

12. The one or more computer-readable memory devices or storage devices of claim 9, wherein the semi-transparent keyboard preview is repositioned responsive to the user sliding the hand on the touch sensitive screen.

13. The one or more computer-readable memory devices or storage devices of claim 9, the acts further comprising:
resizing the semi-transparent keyboard preview responsive to the user sliding the hand and another hand apart from one another.

14. The one or more computer-readable memory devices or storage devices of claim 13, wherein the resizing comprises widening the semi-transparent keyboard preview when the user slides the hand apart from the another hand along an x-axis of the touch sensitive screen.

15. The one or more computer-readable memory devices or storage devices of claim 13, the acts further comprising maintaining finger-to-key relationships during the resizing.

16. A system comprising:
a keyboard gesture identifier module configured to:
recognize a keyboard launch gesture of one or more fingers of a user on a touch sensitive screen;
present a keyboard preview on the touch sensitive screen responsive to the keyboard launch gesture, wherein an object positioned behind the keyboard preview is at least partially visible through the keyboard preview;
while the user maintains contact with at least one of the fingers on the touch sensitive screen and moves the at least one of the fingers on the touch sensitive screen, reposition the keyboard preview on the touch sensitive screen according to the movement of the at least one of the fingers, wherein the object positioned behind the keyboard preview remains at least partially visible during the repositioning;
determine that the at least one of the fingers has ceased making contact with the touch sensitive screen; and
after the at least one of the fingers has ceased making contact with the touch sensitive screen, replace the keyboard preview on the touch sensitive screen with a keyboard that blocks at least part of the object such that the at least part of the object is no longer visible through the keyboard; and
one or more hardware processors configured to execute the keyboard gesture identifier module.

17. The system according to claim 16, further comprising a geometry tracking module configured to track the one or more fingers using contact detectors of the touch sensitive screen.

18. The system according to claim 16, wherein the keyboard preview comprises an outline of the keyboard.

19. The system according to claim 18, wherein the outline of the keyboard does not include keys.

20. The system according to claim 16, wherein the keyboard gesture identifier module is further configured to reposition the keyboard preview responsive to the user sliding their hands on the touch sensitive screen.

21. The system according to claim 16, wherein multiple objects are visible behind the keyboard preview and are blocked by the keyboard.

\* \* \* \* \*